United States Patent [19]
Chick et al.

[11] Patent Number: 5,280,870
[45] Date of Patent: Jan. 25, 1994

[54] COLLAPSIBLE HOLDER FOR A BEVERAGE CONTAINER

[75] Inventors: Allen L. Chick, Wilsonville; Michael E. Thalhofer, Tualatin, both of Oreg.; Brian Atterton, Kapowsin; Veloy Twitchell, Marysville, both of Wash.

[73] Assignee: International Ventures, Ltd., Kapowsin, Wash.

[21] Appl. No.: 994,583

[22] Filed: Dec. 17, 1992

[51] Int. Cl.⁵ ............................................. A47K 1/08
[52] U.S. Cl. .................................. 248/311.2; 211/88; 224/42.45 R; 224/282; 248/154
[58] Field of Search ............................ 248/311.2, 154; 224/42.45 R, 282; 220/85 H; 211/88; 297/194; 108/25, 26

[56] References Cited

U.S. PATENT DOCUMENTS

| | | | |
|---|---|---|---|
| 4,828,211 | 5/1989 | McConnell et al. | 248/311.2 |
| 4,943,111 | 7/1990 | Laan | 297/194 |
| 4,984,722 | 1/1991 | Moore | 224/42.45 R |
| 5,014,956 | 5/1991 | Koyali | 248/311.2 |
| 5,024,411 | 6/1991 | Elwell | 224/281 X |
| 5,072,909 | 12/1991 | Huang | 248/311.2 |
| 5,106,046 | 4/1992 | Rowles | 248/311.2 |
| 5,139,222 | 8/1992 | Koorey | 211/88 X |
| 5,167,392 | 12/1992 | Henricksen | 248/311.2 |
| 5,191,679 | 3/1993 | Harper | 248/311.2 X |

Primary Examiner—J. Franklin Foss
Attorney, Agent, or Firm—Marger, Johnson, McCollom & Stolowitz

[57] ABSTRACT

A holder for a beverage container including a vertical back plate having arms for engaging the side wall of a beverage container, a base member including a flat plate and first and second sidewalls attached to the base plate, and a collapsible bracket which can be engaged with the base member in an upright position, or stored within the holder when in its collapsed configuration.

8 Claims, 4 Drawing Sheets

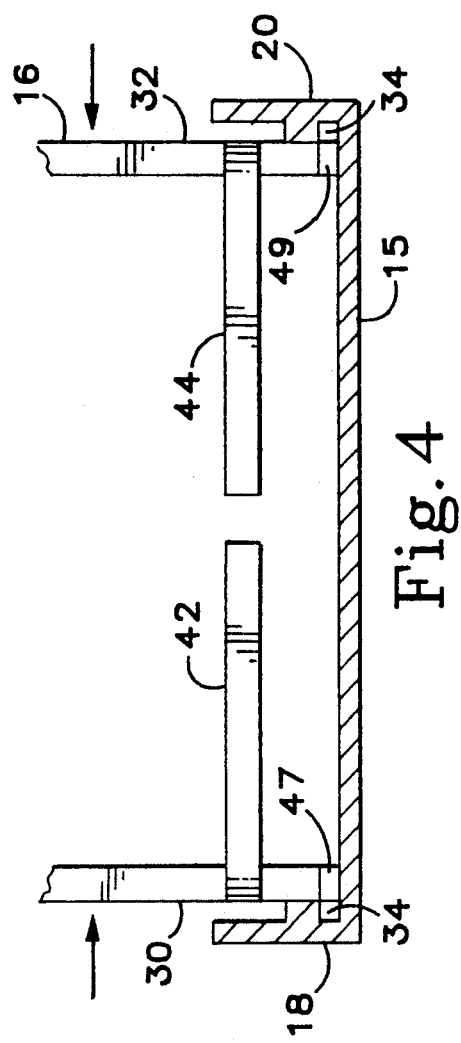
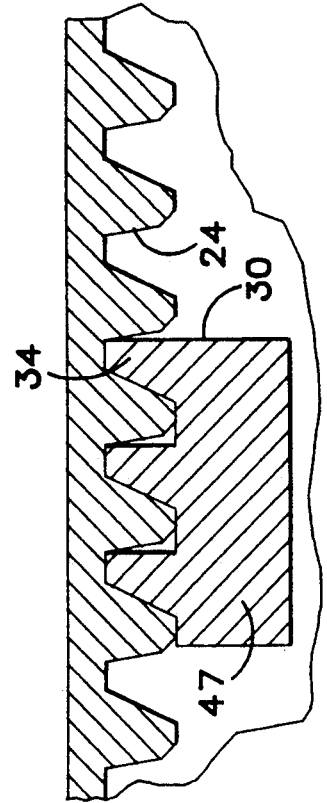
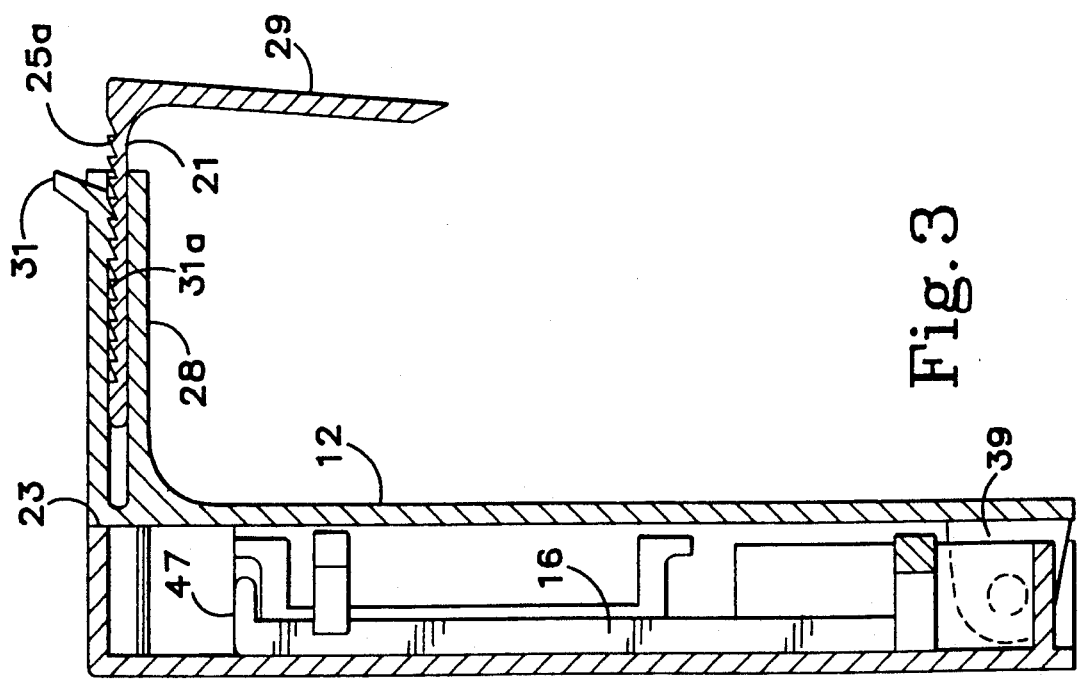
Fig. 4
Fig. 5
Fig. 3

COLLAPSIBLE HOLDER FOR A BEVERAGE CONTAINER

BACKGROUND OF THE INVENTION

1. Field of the Invention

The present invention relates to holders for cups and other beverage containers, and more specifically to a collapsible beverage container suitable for use in an automobile.

2. Background of the Invention

Beverage container holders for use in automobiles, and particularly cupholders which are supported on the door of an automobile are widely known. Beverage container holders may be either collapsible or not, although the collapsible type holders provide the additional. Examples of known cupholders are those disclosed in U.S. Pat. Nos. 4,828,211 and 4,984,772. A beverage container of upholder of this type will accommodate beverage containers of various sizes and shapes.

It is an object of this invention to provide a collapsible holder for beverage containers of various sizes which can be adjusted for use with a variety of container shapes and sizes, and which can be folded and stored in place between uses.

It is a second object of this invention to provide a collapsible holder for beverage containers of various sizes which can be adjusted for use with a variety of container shapes and sizes.

It is another object of this invention to provide a holder for beverage containers which is inexpensive to manufacture, and which includes a minimum number of moving parts.

SUMMARY OF THE INVENTION

The present invention meets the stated objects by providing a holder for a beverage container which may comprise a vertical back plate including arms for engaging the side wall of a beverage container, a base member including a flat plate and first and second sidewalls attached to the base plate, and a collapsible bracket which can be engaged with the base member in an upright position, or stored within the holder when in its collapsed configuration as discussed below.

The vertical back plate may further include a coin holder formed integrally with the back plate and the arms. The base member is pivotally attached to the vertical back plate, and is pivotable between a horizontal position for supporting a beverage container on the base plate, and a vertical position generally parallel to the vertical back plate. The first and second base member sidewalls each include a plurality of parallel channels formed along a portion of the inner surface of the sidewalls. The bracket includes an upper portion supported on a pair of parallel legs. Each leg includes one or more parallel teeth which are sized to engage to engage the parallel channels of the first and second sidewalls for supporting the bracket upper portion in an upright position on the base member for supporting a beverage container. The position of the bracket may be adjusted along the sidewalls toward and away from the back plate as required for receiving and supporting beverage containers of various sizes. The bracket may be disengaged from the sidewalls for storage within a space defined by the vertical back plate and the base member which has been pivoted to its vertical position.

The beverage container may further comprise a hanger mechanism for supporting the beverage container on the door of an automobile. The hanger may comprise a horizontal channel member extending rearwardly from the vertical back plate, and an L-shaped member having a first portion received within the channel. The L-shaped member has a second portion for being inserted downwardly into the window channel in the upper portion of the automobile door. The hanger may be adjustable for use with doors of differing widths by virtue of parallel transverse grooves formed in the first portion of the L-shaped member, and by means of a resilient member operatively connected to the channel for engaging one or more of the parallel grooves for spacing the angled member a pre-selected distance apart from the vertical back plate.

The invention will now be described in greater detail by reference to the drawings.

BRIEF DESCRIPTION OF THE DRAWINGS

FIG. 3 is a cross-sectional view of the beverage container holder shown in FIG. 1 along line A—A in FIG. 2.

FIG. 4 is a cross-sectional view of the beverage container holder shown in FIG. 1 along line B—B in FIG. 1.

FIG. 5 is a cross-sectional view of the beverage container holder shown in FIG. 1 along line C—C in FIG. 3.

DETAILED DESCRIPTION OF THE PREFERRED EMBODIMENT

Figure 1:
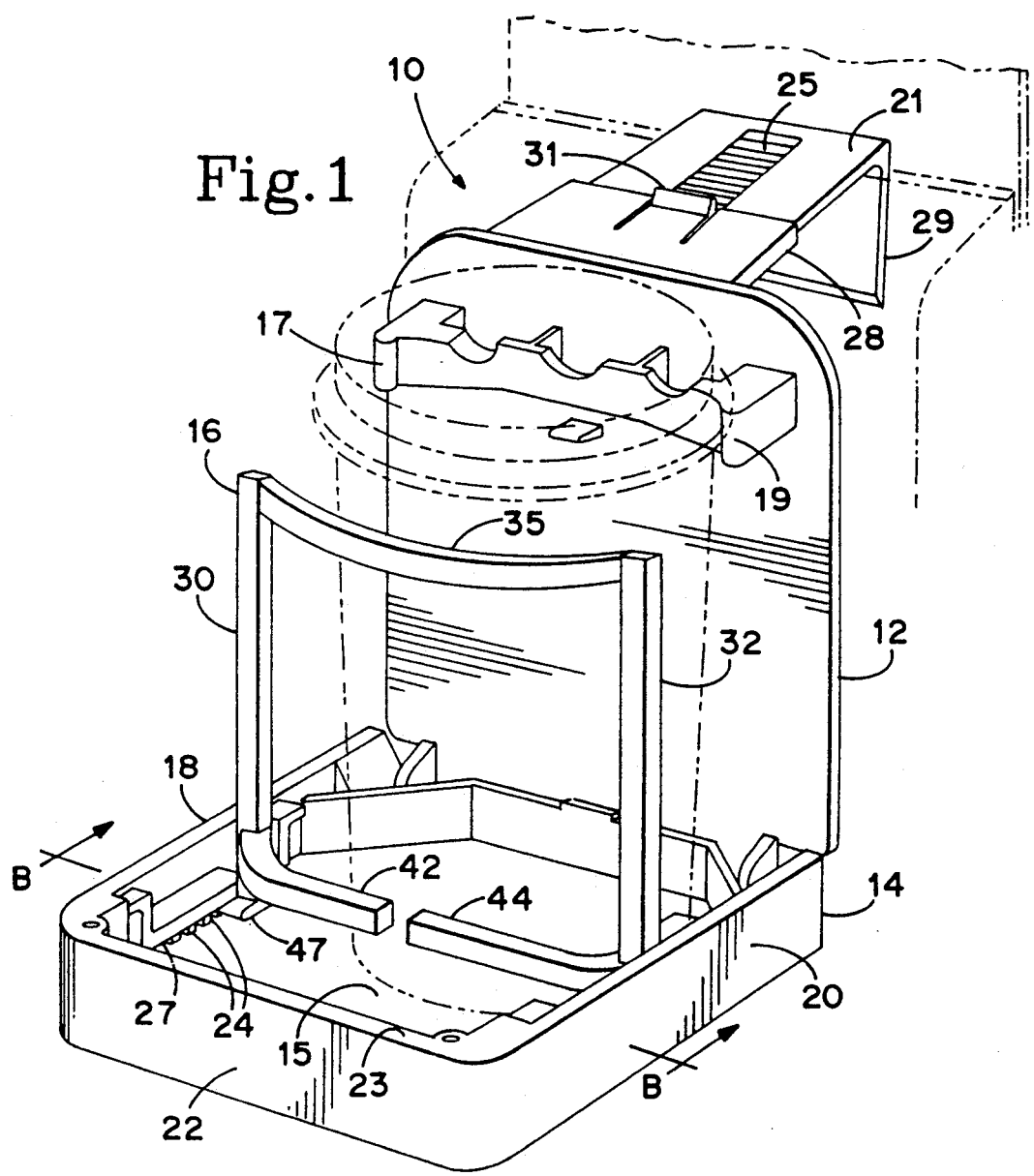
FIG. 1 is a prospective view of a beverage container holder according to the present invention and which is configured for holding a container.

Referring to FIG. 1, a container holder according to the present invention is shown generally at 10. Holder 10 includes vertical back plate 12, an adjustable hanger 13, a pivotable base member 14, and an adjustable bracket 16. Back plate 12 includes a pair of fixed, outwardly projecting arms 17 and 19 for partially encircling a beverage container supported on base member 14. For additional utility and convenience, back plate 12 and arms 17 and 19 are formed to cooperatively define a coin and pencil holder 11 having three differently sized compartments for storing coins 50 and a pencil 51. Space is provided immediately below coin and pencil holder 11 for attaching a small "Post-It ®"-type note pad 52 as well.

Hanger 13 consists of a horizontal channel member 28 extending rearwardly from the upper edge of back plate 12 into which one arm 21 of an L-shaped hanger bracket 29 is inserted. As best shown in FIG. 3, arm 21 is formed with a series of transverse, ratchet-type grooves 25 along its center portion. Grooves 25 are engaged by pawl 31 when arm 21 is inserted into channel member 28. Hanger bracket 29 includes a second perpendicular arm 33 for being inserted downwardly into the window channel of an automobile door (not shown) to hang the holder 10 on the door.

Base member 14 is pivotally attached to back plate 12 by hinge assembly 39. Base member 14 includes a flat portion 15 having perpendicular side walls 18 and 20, each of which is connected at its outer ends to end wall 22. The connected outer edges of side walls and end wall form a continuous edge 23 which abuts back plate 12 when base member 14 is pivoted to its vertical position. Along the inner surface of each side walls 18 and 20 is a channel 27, having a series of parallel grooves 24 and 26 respectively for engaging bracket 16, and having a perpendicular portion 46. Grooves 24 and 26 are molded separately and attached to side walls 18 and 20. Base member 14 is preferably formed by a one-step molding of a polymeric material such as polystyrene.

Bracket 16, also of a unitary molded construction, includes an upper portion 35, legs 30 and 32 and feet 47 and 49. Feet 47 and 49 include outwardly facing parallel teeth 34 and 36 which are sized and oriented to engage grooves 24 and 26 respectively (FIG. 5) for locking bracket 16 in the upright position for holding a container as shown in FIG. 1. Bracket 16 may also be laid flat on back plate 12 for storage, and to that end is sized in length, width and height to fit within the space between back plate 12 and base member 14 when base member is pivoted to its upright position as shown in FIG. 3.

Figure 7:
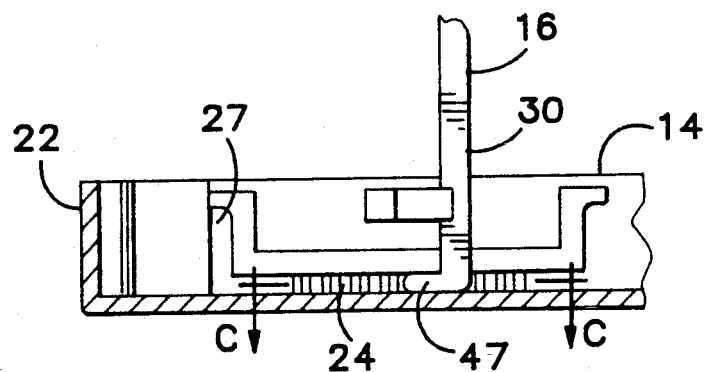
FIG. 7 is a partial side cross-sectional view of the beverage container holder shown in FIG. 1 showing the bracket in its upright position.

In operation, holder 10 is fitted to the door of an automobile by inserting arm 33 of hanger bracket 29 downwardly into the window channel of an automobile door, for example, and sliding back plate 12 to rest against the door to securely clamp holder 10 in place. Owing to the complementary angled surfaces 25a and 31a of grooves 25 and pawl 31, back plate 12 may be adjusted toward the automobile door and locked in place without the need to manually operate pawl 31. Holder 10 is opened for supporting a beverage container by pivoting base member 14 downwardly to its horizontal position as shown in FIG. 1. Bracket 16 is then pivoted to an upright position. Legs 30 and 32 are then gripped and gently squeezed as indicated by the arrows in FIG. 4, and bracket 16 is slid toward back plate 12 to a position selected to fit the particular container. The legs are then released allowing teeth 34 and 36 to engage grooves 24 and 26 and lock bracket 16 in position. As best seen in FIG. 7, grooves 24 and 26 are provided in sufficient number along each side wall to allow bracket 16 to be adjusted toward and away from back plate 12 to accommodate various sized beverage containers. To avoid breaking bracket 16 by overzealous squeezing, stops 42 and 44 (FIG. 4) are provided to limit the available inward displacement of legs 30 and 32. A beverage container may then be placed on base member 14, where it is held in place by bracket 16 and arms 17 and 19.

Figure 2:
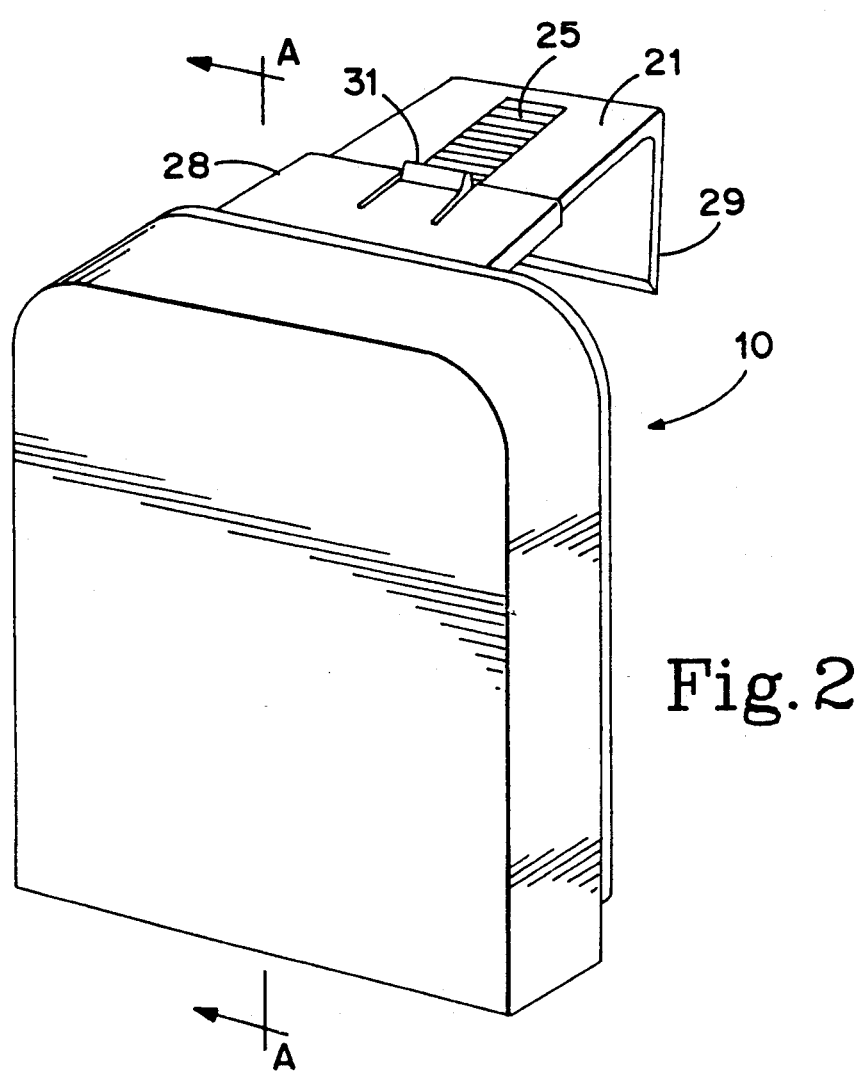
FIG. 2 is a prospective view of the beverage container holder shown in FIG. 1 shown in its collapsed configuration.
Figure 6:
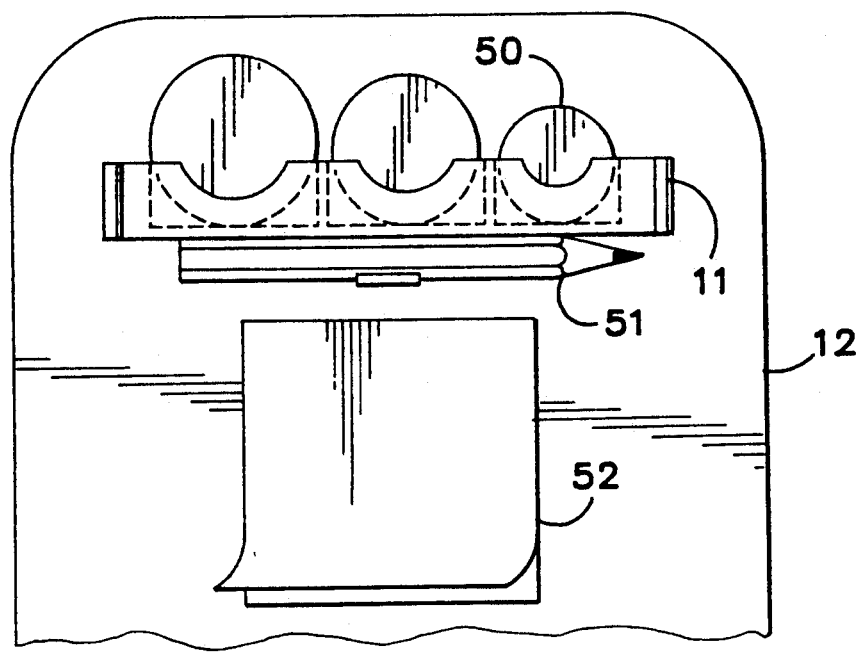
FIG. 6 is a partial plan view of the back plate of a beverage container holder according to the present invention.
Figure 8:
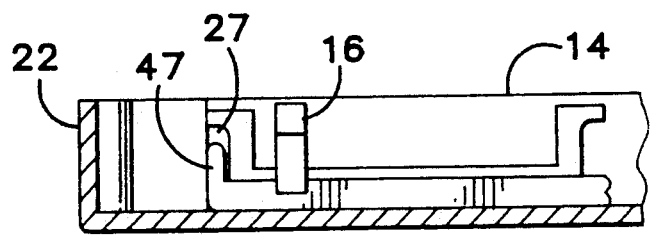
FIG. 8 is a partial side cross-sectional view of the beverage container holder shown in FIG. 1 showing the bracket in its stored position.

When holder 10 is no longer needed, it may be folded as shown in FIG. 2 and left in place on the door. Holder 10 is readily collapsed by squeezing legs 30 and 32 to disengage from grooves 24 and 26. Bracket 16 then slid away from back plate 12 until teeth 34 and 36 are slid beyond grooves 24 and 26; bracket 16 is then pivoted and laid flat in base member 14 as shown in FIG. 8. Base member 14 is then pivoted upwardly until edge 23 meets back plate 12 as shown in FIGS. 2 and 3. The narrow profile of holder 14 in this configuration allows it to be conveniently stored in place on the door where it may be quickly and conveniently opened for use.

Holder 10 may also be removed from the door by manually lifting pawl 31 to disengage it from grooves 25, and sliding back plate 12 slightly away from the door, allowing the holder to be lifted out of the window channel.

Having described my invention in terms of the preferred embodiment, it will be apparent to those skilled in the art that numerous modifications in details and materials are possible. All such modifications are intended to be included within the scope of the following claims.

We claim:

1. A holder for a beverage container comprising:
    a vertical back plate including a protruding surface for engaging a side wall of a beverage container;
    a base member pivotably attached to the vertical back plate and pivotable between a first horizontal position and a second vertical position generally parallel to the vertical back plate;
    the base member including a base plate and first and second side walls connected to the base plate;
    a plurality of grooves formed in each of the first and the second side walls; and
    a bracket having an upper portion and a lower portion, the lower portion including one or more raised surfaces engageable with the grooves of the first and second side walls for supporting the bracket upper portion in an opposed position relative to the vertical back plate for receiving and retaining a beverage container therebetween; and
    the bracket pivotable to a second position disposed within a space defined by the vertical back plate and the base member when the base member is pivoted to its vertical position.

2. An apparatus according to claim 1 wherein the raised surfaces of the bracket are engageable with the grooves of the first and second side walls for supporting the bracket upper portion in a plurality of positions spaced apart from the first member for supporting a plurality of differently sized beverage containers.

3. An apparatus according to claim 1 wherein the first member further comprises a hanger for supporting the beverage container on the door of an automobile.

4. An apparatus according to claim 3 wherein the hanger comprises:
    a channel member extending rearwardly from the vertical back plate and defining a channel;
    an L-shaped member having a first portion slidably received within the channel, and a
    an L-shaped member having a first portion slidably received within the channel, and a second portion for being inserted into an opening of the automobile door.

5. An apparatus according to claim 4 wherein the hanger comprises one or more parallel grooves formed in the L-shaped member first portion, and a pawl operatively connected to the channel member for engaging one or more of the parallel grooves formed in the L-shaped member.

6. An apparatus according to claim 1 which said vertical back plate further comprises surfaces defining a coin holder.

7. An apparatus according to claim 1 which said vertical back plate further comprises surfaces defining a holder for holding a writing instrument.

8. An apparatus according to claim 1 which further comprises a note pad attached to the vertical back plate.

* * * * *